United States Patent
Yamashita

(10) Patent No.: US 6,636,794 B2
(45) Date of Patent: Oct. 21, 2003

(54) PASSIVE SAFETY SYSTEM

(75) Inventor: Toshiyuki Yamashita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 46 days.

(21) Appl. No.: 09/985,835

(22) Filed: Nov. 6, 2001

(65) Prior Publication Data

US 2002/0169534 A1 Nov. 14, 2002

(30) Foreign Application Priority Data

May 11, 2001 (JP) ........................................ 2001-142151

(51) Int. Cl.$^7$ .............................................. B60R 21/32
(52) U.S. Cl. ........................................ 701/46; 280/735
(58) Field of Search ............................. 701/45, 46, 47; 280/734, 735

(56) References Cited

U.S. PATENT DOCUMENTS

| | | | | |
|---|---|---|---|---|
| 5,440,485 A | * | 8/1995 | Okimoto et al. | 701/46 |
| 5,732,374 A | * | 3/1998 | Ohm | 701/45 |
| 6,236,922 B1 | * | 5/2001 | Andres | 701/45 |
| 6,246,937 B1 | * | 6/2001 | Miyaguchi et al. | 701/45 |
| 6,460,882 B1 | * | 10/2002 | Andres | 280/735 |

FOREIGN PATENT DOCUMENTS

| | | |
|---|---|---|
| DE | 39 24 507 | 8/1990 |
| DE | 42 39 582 | 5/1993 |
| DE | 196 09 077 | 8/1997 |
| DE | 198 54 529 | 9/1999 |
| DE | 198 28 338 | 12/1999 |
| DE | 199 00 327 | 7/2000 |
| DE | 199 17 710 | 10/2000 |
| DE | 100 40 111 | 2/2002 |
| DE | 100 50 956 | 5/2002 |
| DE | 100 65 518 | 7/2002 |

* cited by examiner

*Primary Examiner*—Michael J. Zanelli
(74) *Attorney, Agent, or Firm*—Sughrue Mion, PLLC

(57) ABSTRACT

A passive safety system has a passive safety device mounted on a vehicle, and a passive safety control means having an acceleration sensor detecting acceleration caused by an impact at the time of collision. The passive safety control means receives input an impact acceleration detection signal from the acceleration sensor and operates controllably the passive safety device. Further, the passive safety control means computes a physical quantity based on the impact acceleration detection signal inputted from the acceleration sensor, sets maximum and minimum reference values of the physical quantity in normal driving, performs a computation with respect to addition of a present acceleration inputted from the acceleration sensor to an integrated acceleration value at this point in time when the physical quantity crosses a range defined between the maximum and minimum reference values, and performs a computation with respect to a reset process of the integrated acceleration value when the physical quantity remains within the range defined between the maximum and minimum reference values.

18 Claims, 15 Drawing Sheets

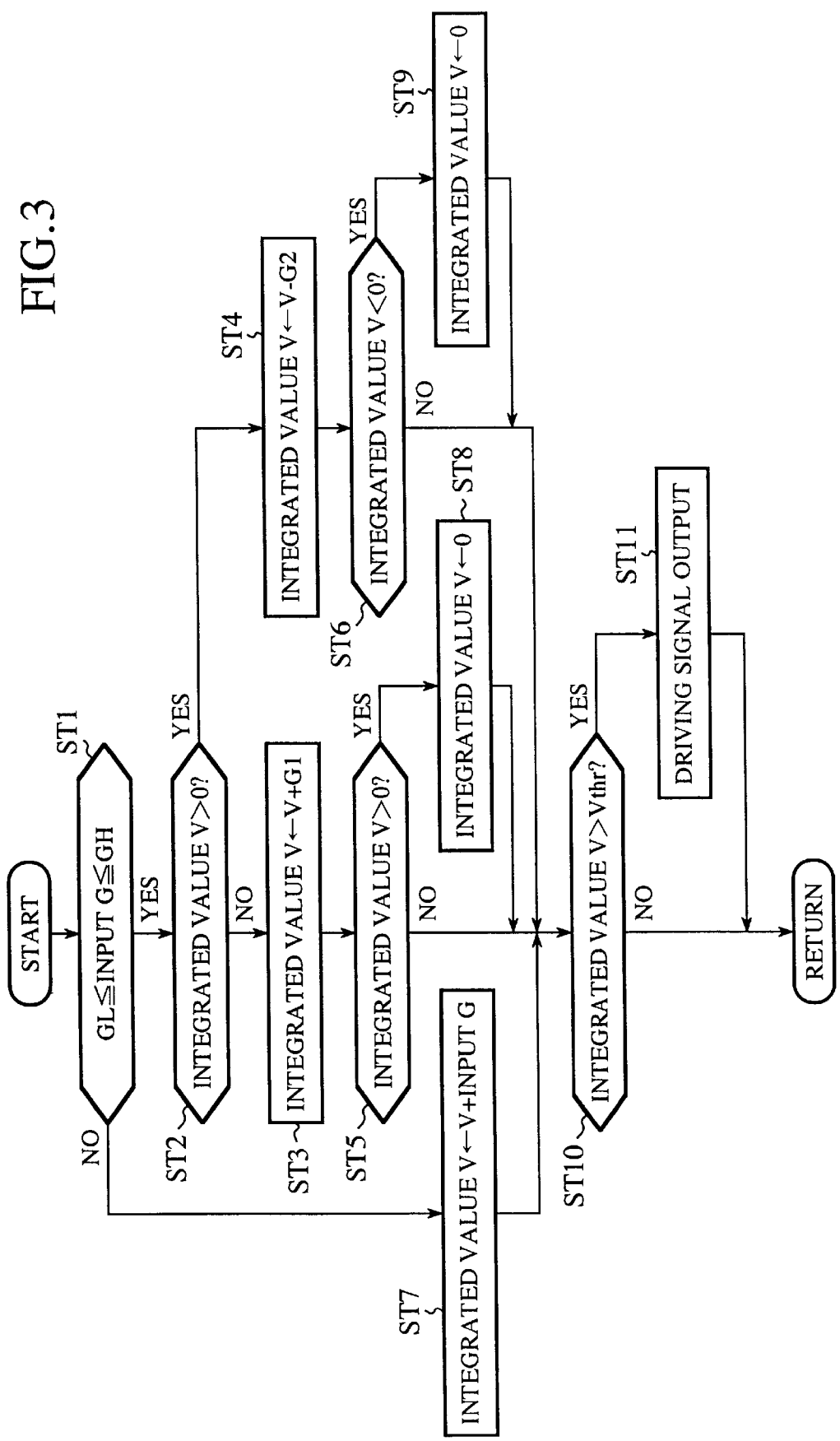

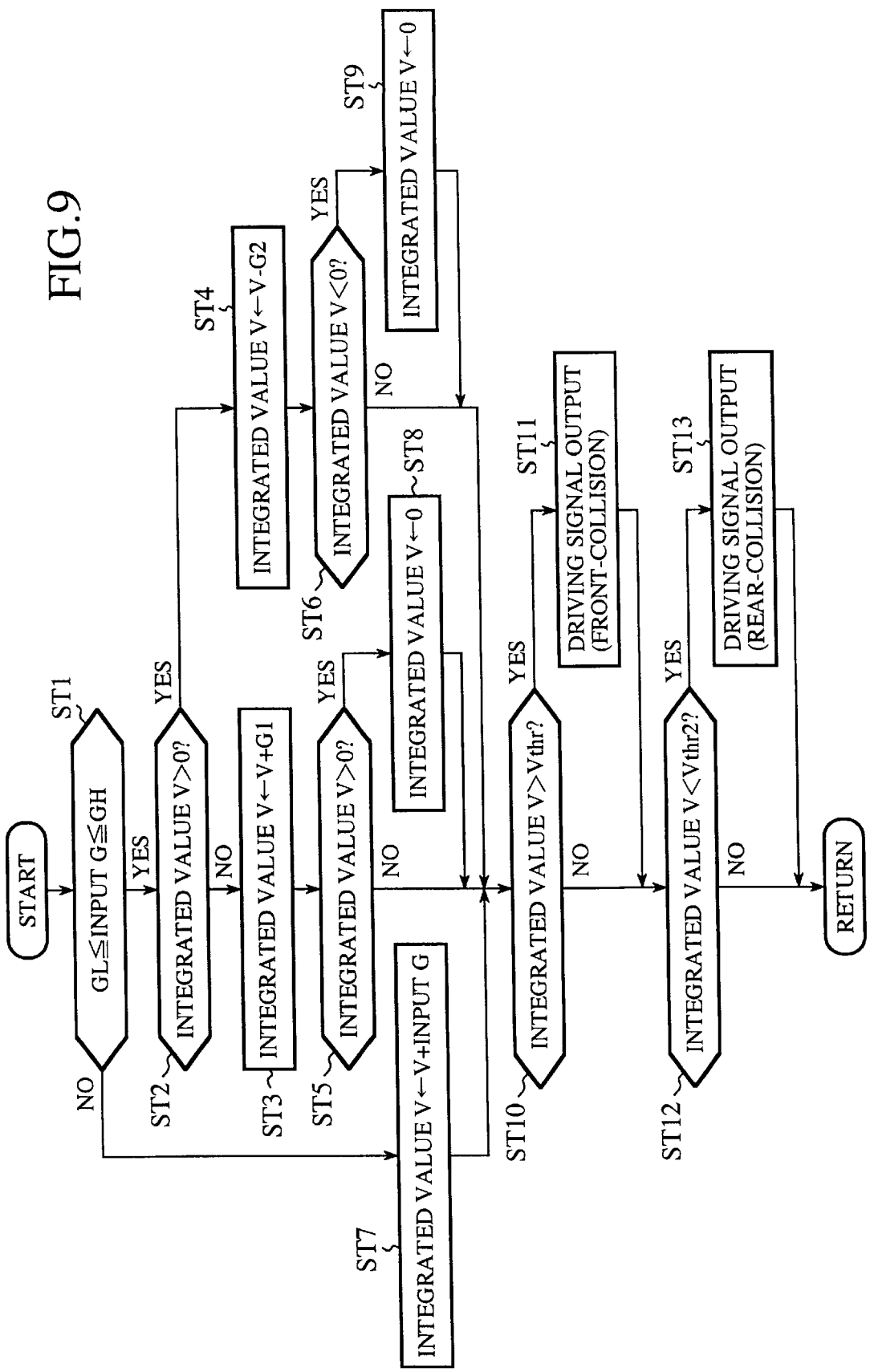

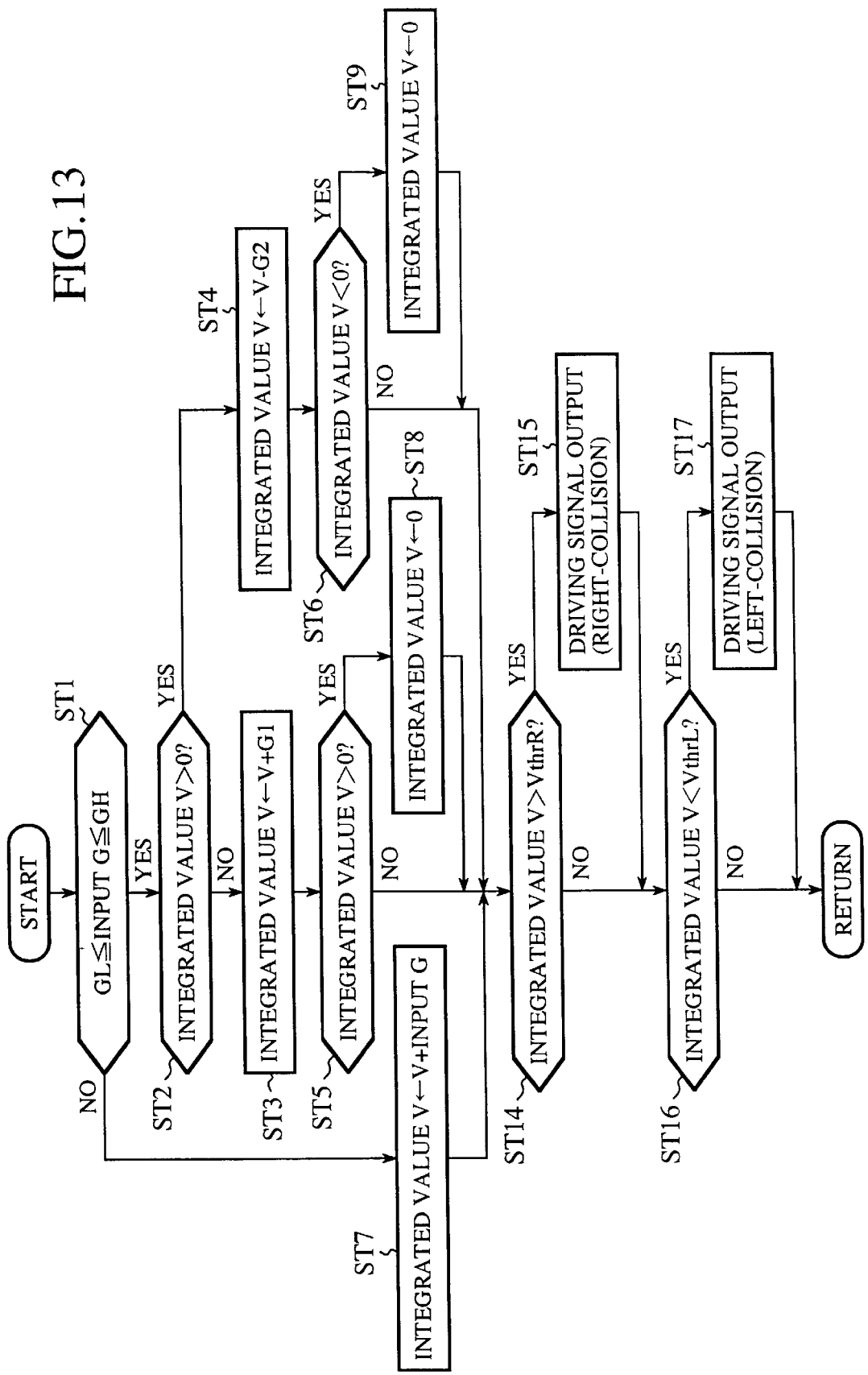

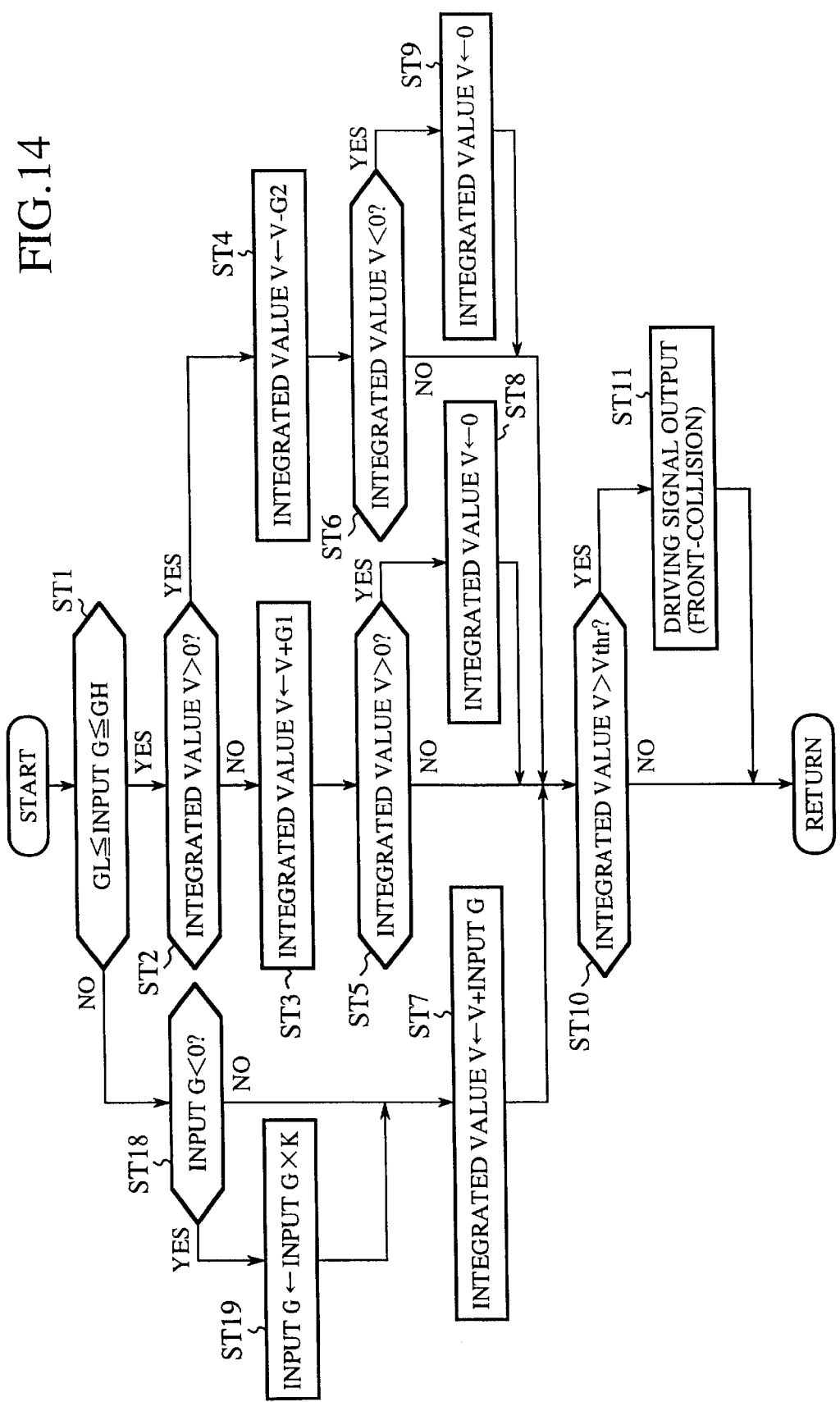

PASSIVE SAFETY SYSTEM

BACKGROUND OF THE INVENTION

1. Field of the Invention

The present invention relates to a passive safety system including a passive safety device and a control device operating controllably the passive safety device. Especially, the present invention relates to a passive safety system having features of determining whether impacts at the time of collision necessitate an operation of the passive safety device or not, and controlling the operation of the passive safety device based on the determined result.

2. Description of the Prior Art

FIG. 1 is a plan view showing a front section of a vehicle (automobile) including a conventional passive safety system. In the drawing, a reference numeral 1 denotes a vehicle, 2 denotes an airbag acting as a passive safety device arranged at a front of seats mounted on the vehicle 1, and 3 denotes a passive safety control means developing the airbag 2. The passive safety control means 3 includes an acceleration sensor (not shown) and a microcomputer (not shown) receiving input an acceleration detection signal from the acceleration sensor as a digital signal.

An operation will be hereafter explained.

When the vehicle 1 undergoes an impact of a head-on collision, the acceleration sensor mounted in the interior of the passive safety control means 3 detects the acceleration caused by an impact at the time of collision to output with respect to the acceleration detection signal to the microcomputer. The microcomputer performs an operation based on the acceleration detection signal inputted from the acceleration sensor to determine whether the airbag 2 should be developed or not. With the determination, deceleration of the vehicle becomes important. The passive safety control means 3 integrates the impact acceleration detection value obtained from input signals inputted from the acceleration sensor with respect to time, and calculates the deceleration. An offset component due to noise with respect to the input signals however superimposes on the deceleration in practical, and the integrated value of the impact acceleration is accumulated due to the offset component in normal driving.

With the conventional passive safety system constituted as described above, it takes measures to reset the integrated value under a given condition to prevent the accumulation of the integrated value of the impact acceleration in normal driving. In this case, since it is however difficult to reset in good timing, a reset process means for resetting the integrated value in good timing must be newly added to the existing constitution.

Another conventional passive safety system uses a method including the steps of setting a required subtraction value, performing a subtraction from an input value inputted from the acceleration sensor always, and then modifying the integrated acceleration value to zero when the integrated acceleration value is zero or less. Since a ratio subtracted when a low-impact is inputted over a long time is however different from a ratio when a high-impact is inputted over a short time, it is difficult to calculate a precise integrated value.

SUMMARY OF THE INVENTION

Accordingly, it is an object of the invention to provide a passive safety system calculating precisely a deceleration caused by an impact at the time of collision and calculating precisely a deceleration without accumulating the acceleration integral without adding a major processing to the existing constitution in normal driving.

It is an object of the invention to provide a passive safety system determining precisely whether the integrated acceleration value at the time of collision is or not a value which necessitate an operation of the passive safety device.

It is an object of the invention to provide a passive safety system calculating precisely the integrated acceleration value using a simple method without dividing a calculation of the integrated acceleration value into an accelerated direction and a decelerated direction.

It is an object of the invention to provide a passive safety system further rapidly distinguishing a collision from a driving over a rough road.

It is an object of the invention to provide a passive safety system calculating precisely the deceleration at the time of collision by postponing a reset process of the integrated acceleration value when the physical quantity provisionally enters within a reference value range due to a vibration component of collision.

In order to achieve the object of the present invention, a passive safety control means of the passive safety system computes a physical quantity based on the impact acceleration detection signal inputted from the acceleration sensor, and sets maximum and minimum reference values of the physical quantity in normal driving. The passive safety control means then performs a computation with respect to addition of a present acceleration inputted from the acceleration sensor to an integrated acceleration value at this point in time when the physical quantity crosses a range defined between the maximum and minimum reference values. Alternatively, the passive safety control means performs a computation with respect to a reset process of the integrated acceleration value when the physical quantity remains within the range defined between the maximum and minimum reference values. In this way, it is possible to keep the integrated acceleration value in normal driving to zero and to calculate precisely the deceleration of collision.

The passive safety control means may output an operational signal operating the passive safety device when an integrated reference value of the integrated acceleration value computed based on the impact acceleration detection signal inputted from the acceleration sensor. In this way, it is possible to operate the passive safety device without any error.

The passive safety control means may have a high-frequency attenuation means attenuating a high-frequency with respect to an impact signal inputted from the acceleration sensor, the impact signal being a physical quantity operated on the basis of the impact acceleration detection signal inputted from the acceleration sensor, the high-frequency attenuation means including a high-frequency breaking circuit and a sectional balancing process means; and a feature of processing an operational result passed through the high-frequency attenuation means as an input value. In this way, it is possible to determine whether a collision necessitates an operation of the passive safety device or not, with stability without respect to a high-frequency noise.

The passive safety control means may include a filter means extracting a frequency component being a physical quantity operated on the basis of the impact acceleration detection signal inputted from the acceleration sensor, which is peculiar to a collision of the vehicle from the acceleration signal inputted from the acceleration sensor; and a feature of processing an operational result passed through the filter means as an input value. In this way, it is possible to distinguish a normal state with stability from a collision state.

The passive safety control means of the passive safety system may have features of dividing a physical quantity operated on the basis of the impact acceleration detection signal inputted from the acceleration sensor into the negative and positive components, setting a required weighted scaling with respect to the negative and positive components, and processing a multiplication result due to the weighted scaling as an input value. In this way, it is possible to prevent integral of the acceleration with respect to a vibration wave caused on a driving of a rough road. Inversely, when the weights are performed to input a value resulting from multiplying an attenuation directional component by a required scaling, the integrated acceleration value becomes small with respect to the attenuation directional component caused at the time of collision. The weights of the attenuation directional component are therefore different from those of the acceleration directional component, and it is possible to result in the collision being rapidly distinguished from the driving over the rough road.

The passive safety control means of the passive safety system has features of computing a physical quantity based on the impact acceleration detection signal inputted from the acceleration sensor, setting maximum and minimum reference values of the physical quantity in normal driving, performing a computation with respect to addition of a present acceleration inputted from the acceleration sensor to the physical quantity when the physical quantity crosses a range defined between the maximum and minimum reference values, setting a function of operating a subtraction value or an addition value with respect to the present integrated acceleration value when the physical quantity remains within the range defined between the maximum and minimum reference values, and performing a subtraction or an addition of the integrated acceleration value based on the function to modify a reset period of the integrated acceleration value. In this way, it is possible to shorten a reset time of the integrated acceleration value.

The passive safety control means of the passive safety system computes a physical quantity based on the impact acceleration detection signal inputted from the acceleration sensor, and sets maximum and minimum reference values of the physical quantity in normal driving. The passive safety control means then performs a subtraction of an integrated acceleration value when the integrated acceleration value at the time the physical quantity crosses a range defined between the maximum and minimum reference values is positive. Alternatively, the passive safety control means performs an addition of the integrated acceleration value when the integrated acceleration value at the time the physical quantity remains within the range defined between the maximum and minimum reference value is negative. It is therefore possible to monitor the integrated acceleration value at the present time. When the integrated acceleration value is positive, a subtraction of required value can be performed. When the integrated acceleration value is negative, an addition of required value can be performed. In this way, it is possible to perform a reset process so as to converge the integrated acceleration value in normal driving to zero at all times, and prevent the accumulation due to a superimposing of the noise component. It is therefore possible to calculate precisely the integrated acceleration value using a simple method without dividing a calculation of the integrated acceleration value into an accelerated direction and a decelerated direction.

The acceleration sensor may be set to detect the acceleration in a longitudinal direction of the vehicle. In this case, when any one of front and rear sides is defined as the positive component of the acceleration sensor, the other side is defined as the negative component of the acceleration sensor, the passive safety control means may have features of operating controllably the passive safety device arranged at a positive component side when the integrated acceleration value based on the acceleration detection signal inputted from the acceleration sensor exceeds a reference value of the integrated acceleration value set as the positive component, and operating controllably the passive safety device arranged at a negative component side when the integrated acceleration value based on the acceleration detection signal inputted from the acceleration sensor does not attain a reference value of the integrated acceleration value set as the negative component. In this way, it is possible to determine a collision in both of front and rear collisions due to the same logic, and operate controllably the passive safety device without any error.

The acceleration sensor may be set to detect the acceleration in a lateral direction of the vehicle. In this case, when any one of right and left sides is defined as the positive component of the acceleration sensor, the other side is defined as the negative component of the acceleration sensor, the passive safety control means may have features of operating controllably the passive safety device arranged at a positive component side when the integrated acceleration value based on the acceleration detection signal inputted from the acceleration sensor exceeds a reference value of the integrated acceleration value set as the positive component, and operating controllably the passive safety device arranged at a negative component side when the integrated acceleration value based on the acceleration detection signal inputted from the acceleration sensor does not attain a reference value of the integrated acceleration value set as the negative component. In this way, when a collision is caused in the lateral direction of the vehicle, it is possible to control both of the passive safety devices at the same time.

The passive safety control means of the passive safety system may have features of computing a physical quantity based on the impact acceleration detection signal inputted from the acceleration sensor, setting maximum and minimum reference values of the physical quantity in normal driving, performing a computation with respect to addition of a present acceleration inputted from the acceleration sensor to an integrated acceleration value at this point in time when the physical quantity crosses a range defined between the maximum and minimum reference values, measuring a period of time after the physical quantity exceeds the range, and postponing a reset process of the integrated acceleration value when the measured time period is shorter than a required period. In this way, it is possible to postpone a reset process of the integrated acceleration value when the physical quantity provisionally enters within a reference value range due to a vibration component of collision, and calculate further precisely the deceleration at the time of collision.

BRIEF DESCRIPTION OF THE DRAWINGS

FIG. 3 is a flowchart for explaining an operation in FIG. 2.

FIG. 9 is a flowchart used for explaining an operation in FIG. 8.

FIG. 13 is a flowchart used for explaining an operation in FIG. 12.

FIG. 14 is a flowchart used for performing a computation in a microcomputer in embodiment 4 according to the present invention.

DESCRIPTION OF THE PREFERRED EMBODIMENT OF THE INVENTION

Embodiments of the present invention will be hereafter explained.
Embodiment 1

Figure 1:
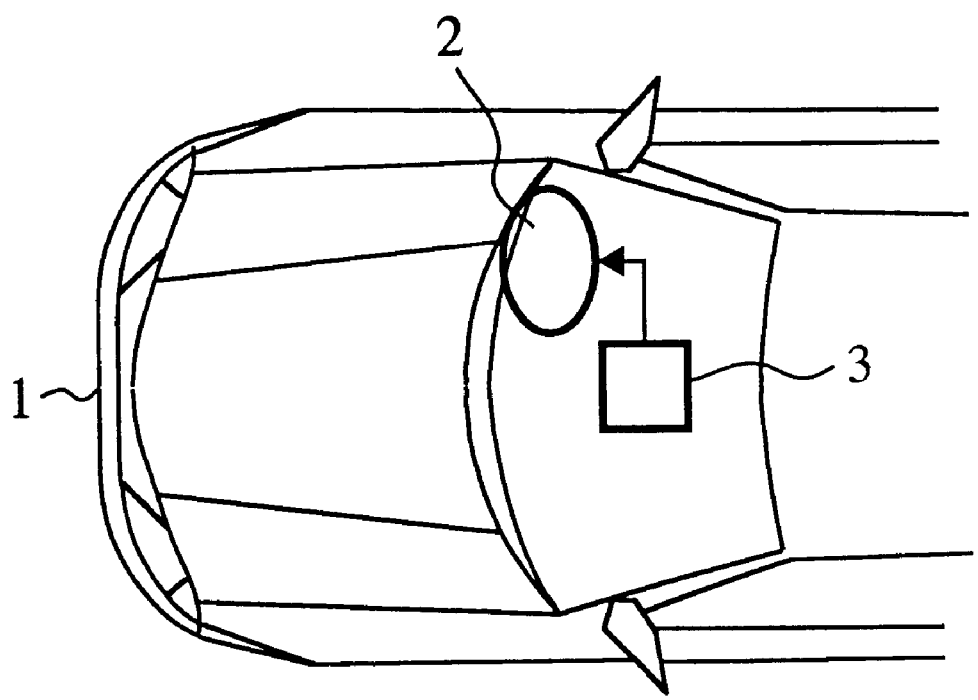
FIG. 1 is a plane view showing a front section of a vehicle providing with a conventional passive safety system.
Figure 2:
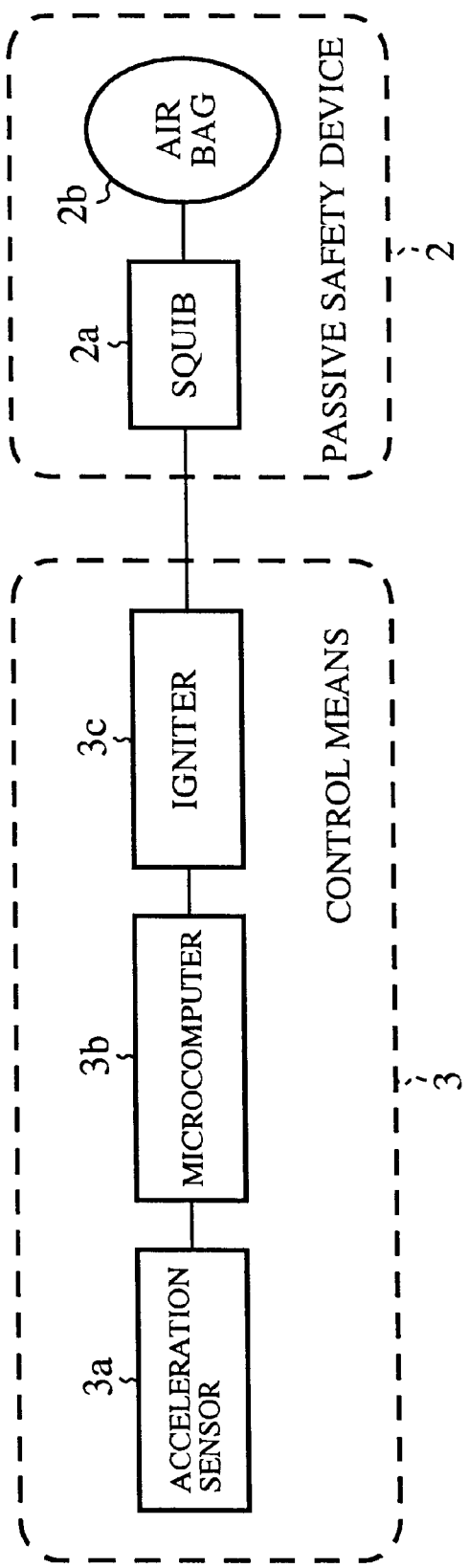
FIG. 2 is a general block diagram showing a passive safety system as embodiment 1 according to the present invention.

FIG. 2 is a general block diagram showing a passive safety system as embodiment 1 according to the present invention. Components of the embodiment 1 common to the conventional components shown in FIG. 1 are denoted by the same reference numerals and further description will be omitted.

In FIG. 2, a reference numeral 2 denotes a passive safety device mounted on the vehicle 1 (see FIG. 1). The passive safety device 2 includes a squib (initiation device) 2a and an airbag 2b expanded by the squib 2a. A reference numeral 3 denotes a control means controlling the passive safety device 2. The control means 2 includes an acceleration sensor 3a for detecting impact acceleration caused at the time of front-collision of the vehicle 1, a microcomputer 3b inputted the acceleration detection signal from the acceleration sensor 3a as a digital data due to an A/D converter, and an igniter 3c receiving an output signal from the microcomputer 3b to supply an ignition current to the squib 2a.

An operation will be hereafter explained.

When the vehicle 1 is driven, the acceleration sensor 3a detects impact acceleration at all times. The acceleration detection signal inputs to the microcomputer 3b to perform a computation. That is, the microcomputer 3b computes the amplitude of the acceleration detection signal inputted from the acceleration sensor 3a, and determines whether or not to expand the airbag 2b. With the determination, the impact acceleration due to the input signal from the acceleration sensor 3a becomes large on the front collision of the vehicle. In this case, the output signal from the microcomputer 3b starts working of the igniter 3c to energize the squib 2a. As a result, the airbag 2b is expanded.

Here, the microcomputer 3b includes a controllable reference value setting means (memory), a computing means, and a reset process means acting as principal components. The controllable reference value setting means sets a maximum acceleration reference value (acceleration upper limit value) GH and a minimum acceleration reference value (acceleration lower limit value) GL, which are assumed in normal driving. The computing means compares a physical quantity, which is based on impact acceleration detection signals inputted from the acceleration sensor 3a via an A/D converter, with the maximum acceleration reference value GH and the minimum acceleration reference value GL, and performs the computation. The reset process means performs a reset process so as to converge the integrated acceleration value as the computation result to zero in normal driving.

An operation according to a control program of the microcomputer 3b will be hereafter explained.

FIG. 3 is a flowchart for explaining an operation in FIG. 2, which relates to a determination of collision at the time of front-collision. Moreover, the explanation will be made based on the premise that the impact acceleration detection signal inputted from the acceleration sensor 3a is defined as an input G of the microcomputer 3b, and the input G in a deceleration direction is positive as for the polarity of the input G.

First, in normal driving, an absolute value of the impact acceleration detected by the acceleration sensor 3a is 2G or less under normal conditions, and is small. The input G of the microcomputer 3b inputted from the acceleration sensor 3a remains within a range defined from the minimum acceleration reference value GL to the maximum acceleration reference value GH.

Thus, in step ST1, 'yes' or 'no' is determined as to whether the input G remains within the range above (GL≦input G≦GH). When 'yes' is determined, the process goes to step ST2. In the step ST2, the determination is made as to whether the integrated acceleration value V exceeds zero at the present time in driving (V>0). When the integrated acceleration value V exceeds zero, the process goes to step ST4. In the step ST4, the integrated reference value G predetermined is subtracted from the integrated acceleration value V at the present time, and the process then goes to step ST6. In the step ST6, it is determined as to whether the integrated acceleration value V after the subtraction of the step ST4 is lower than zero (V<0). When the integrated acceleration value V after the subtraction is lower than zero, the process goes to step ST9. In the step ST9, a computation, in which the integrated acceleration value V lower than zero is defined as zero, is performed. When the integrated acceleration value V is higher than zero, a reset process, in which the integrated acceleration value V is converged to zero, is performed by the steps ST4, ST6 and ST9.

On the other hand, when the determination of the step ST2 results in 'no' (when the integrated acceleration value is lower than zero), the process goes to step ST3. In the step ST3, the integrated reference value G1 is added to the integrated acceleration value V at the time and the process goes to step ST5. In the step ST5, it is determined as to whether the integrated acceleration value V after the addition of the step ST3 is higher than zero (V>0). When the integrated acceleration value V after the addition of the step ST3 is higher than zero, and the process goes to step STB. In the step ST8, a computation, in which the integrated acceleration value V higher than zero is defined as zero, is performed. When the integrated acceleration value V is lower than zero, a reset process, in which the integrated acceleration value V is converged to zero, is performed by the steps ST3, STS and STS.

The description above relates to an operation for processing in a case where the impact acceleration is small when the vehicle is driven normally. Next, an operation for processing in a case where the large impact acceleration is inputted to the microcomputer 3b except when the vehicle is driven normally will be explained.

When the determination of the step ST1 results in 'no', that is, when the input G, which crosses the range defined from the GL to the GH, is a large impact acceleration, the process goes to step ST7. In the step ST7, the input G is added to the integrated acceleration value V at the present time. As such a process is performed, the integrated acceleration value V is converged to zero at all times in normal driving, and is integrated when the vehicle undergoes a large impact at the time of collision. The integrated acceleration value V becomes large when a speed of the vehicle is high at the time of collision.

After the addition process is performed in the step ST7, the process goes to step ST10. In the step ST10, the integrated acceleration value V after the addition of the step ST7 is compared with a threshold value Vthr, which is predetermined to drive the passive safety device, and the computation is performed. As a result of the computation, when the integrated acceleration value V after the addition above is larger than the threshold value Vthr, the process goes to step ST11, and an airbag driving signal is outputted to the igniter 3c of FIG. 2.

Next, a real collision pattern will be explained, which relates to the timing of outputting a driving signal of airbag when the computation of the flowchart shown in the FIG. 3 is performed.

Figure 4A:
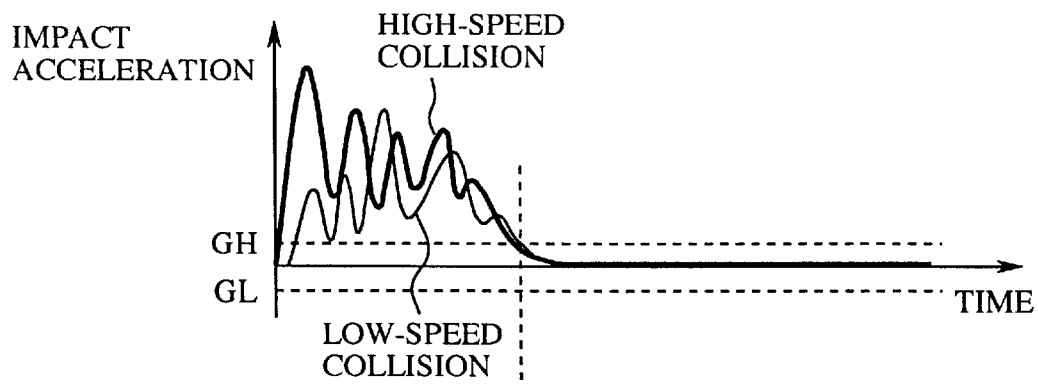
FIG. 4A, FIG. 4B and FIG. 4C are drawings showing timing of outputting a driving signal when an operation indicated in the flowchart of FIG. 3 is performed in real collision patterns (distinguishing high-speed collision from low-speed collision).
Figure 4B:
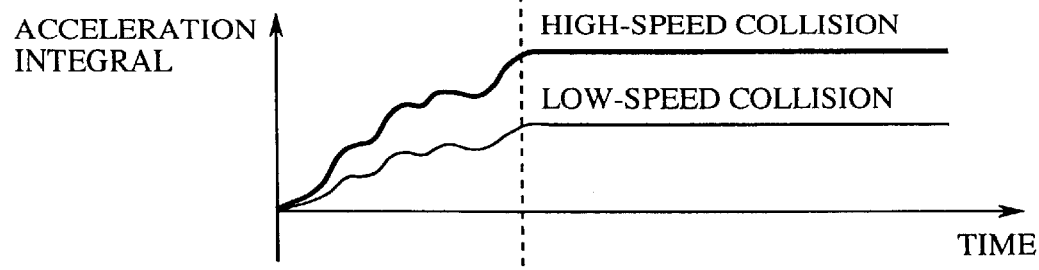

On collision of the vehicle caused at high speed and on collision of the vehicle caused at low speed, the impact acceleration is produced as shown in FIG. 4A. Here, the speed of the vehicle on collision is calculated due to the integral of the impact acceleration as shown in FIG. 4B. The size of collision is evaluated depending on the speed of the vehicle.

With the computation of the flowchart, when the collision is caused, the physical quantity exceeds the maximum acceleration reference value (integrated value reset acceleration threshold value positioned at the upper limit of the acceleration) GH, and the integral process is therefore started. During the collision, the impact acceleration exceeding the maximum acceleration reference value GH is produced without interruption. The integrated value V, which is the approximately same as the acceleration integral as shown in FIG. 4B, is obtained as the computation result (see FIG. 4C).

Figure 4C:
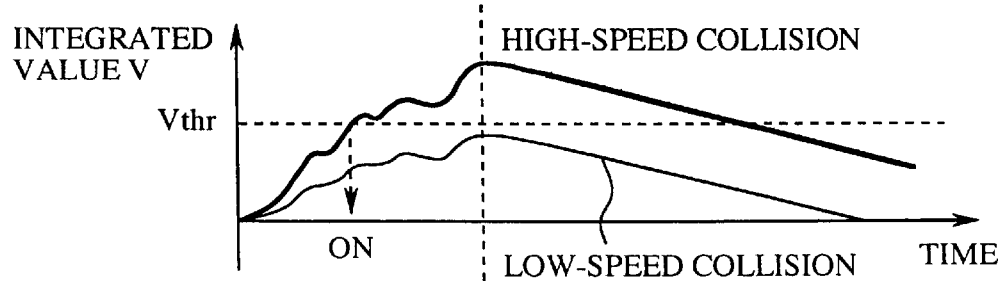

When the collision of the vehicle is caused at low speed which does not necessitate an operation of the passive safety device, the impact acceleration becomes small as shown in FIG. 4A, and the acceleration integral becomes also small as shown in FIG. 4B. Here, as shown in FIG. 4C, the integrated value V does not cross the driving signal output threshold value Vthr predetermined. The driving signal is not outputted to the airbag.

When the collision of the vehicle is however caused at high speed, the impact acceleration becomes large as shown in FIG. 4A, and the acceleration integral becomes also large as shown in FIG. 4B. In other words, the integrated value V, which is obtained by performing the computation pursuant to the flowchart above, exceeds the driving signal output threshold value Vthr as shown in FIG. 4C. At this time, the driving signal is outputted to operate the passive safety device 2. The airbag 2b is therefore expanded.

Several cases, where the vehicle drives on a rough road and where the vehicle is stopped by braking, are listed up as examples, which do not necessitate an operation of the passive safety device 2, except for the collision.

Figure 5A:
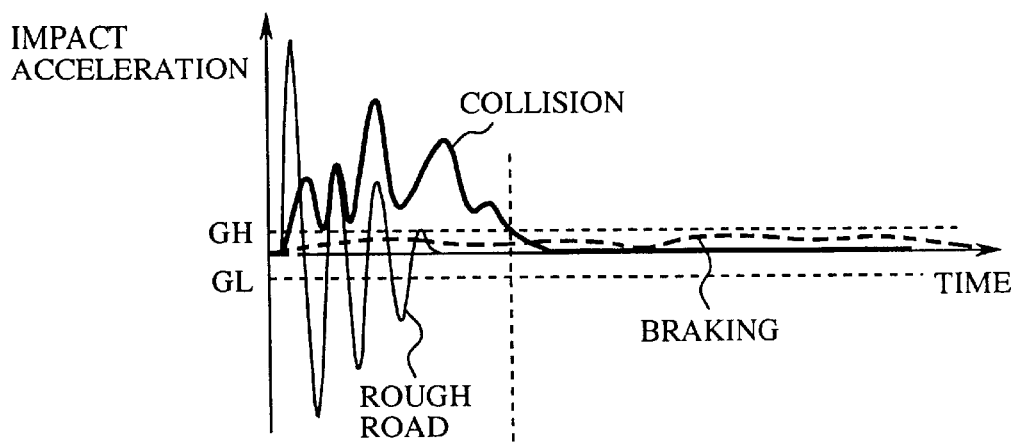
FIG. 5A, FIG. 5B and FIG. 5C are drawings showing timing of outputting a driving signal when an operation indicated in the flowchart of FIG. 3 is performed in real collision patterns (distinguishing a collision from rough road or braking).
Figure 5B:
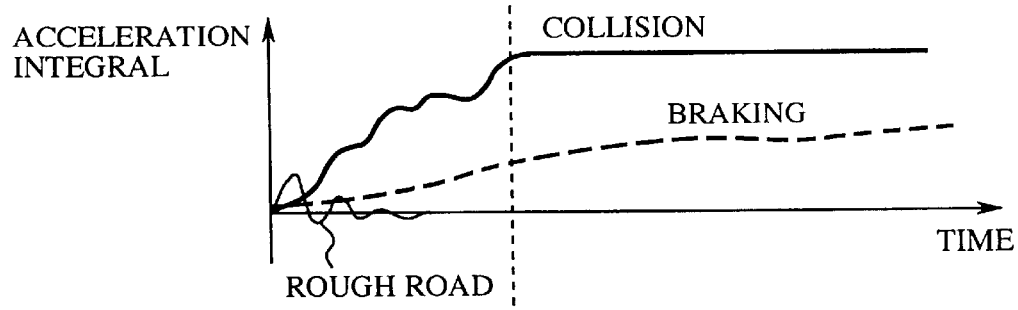
Figure 5C:
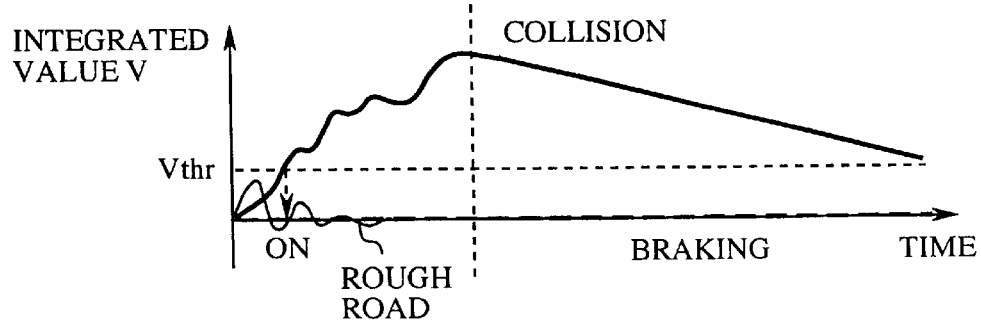

A waveform of the impact acceleration at the time of driving on the rough road is a large-amplitude vibration wave as shown in FIG. 5A. This case is characterized in that the acceleration integral is small as shown in FIG. 5B.

The integrated value V, which is obtained by performing the computation pursuant to the flowchart above, is smaller than the input above. The integrated value V does not exceed the driving signal output threshold value Vthr, and the driving signal is outputted to the passive safety device 2.

Regarding a waveform of the impact acceleration at the time of braking, the small impact acceleration is produced as shown in FIG. 5A. However, this case is characterized in that the acceleration integral is large as shown in FIG. 5B. Since the inputted impact acceleration G of the computation pursuant to the flowchart remains within a range defined between the minimum acceleration reference value GL and the maximum acceleration reference value GH, the acceleration integral is not performed, and the integrated acceleration value V is kept to zero. As a result, the integrated acceleration value V exceeds the driving signal output threshold value Vthr, and the driving signal is not outputted to the passive safety device.

Figure 6A:
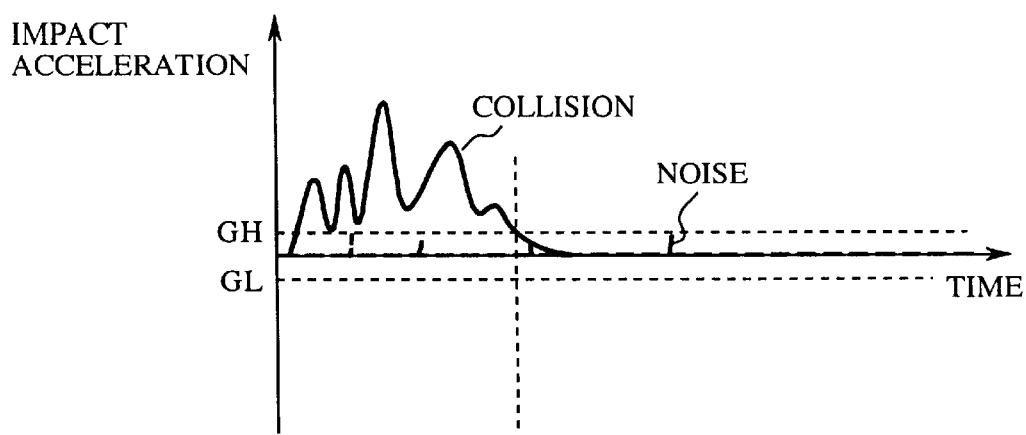
FIG. 6A, FIG. 6B and FIG. 6C are drawings showing timing of outputting a driving signal when an operation indicated in the flowchart of FIG. 3 is performed in real collision patterns (distinguishing a collision from noise).
Figure 6B:
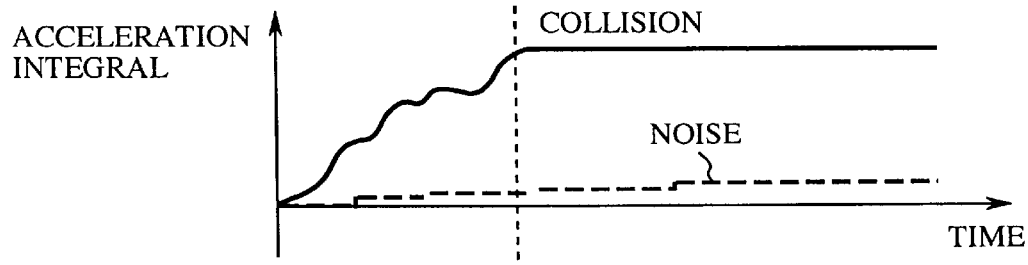
Figure 6C:
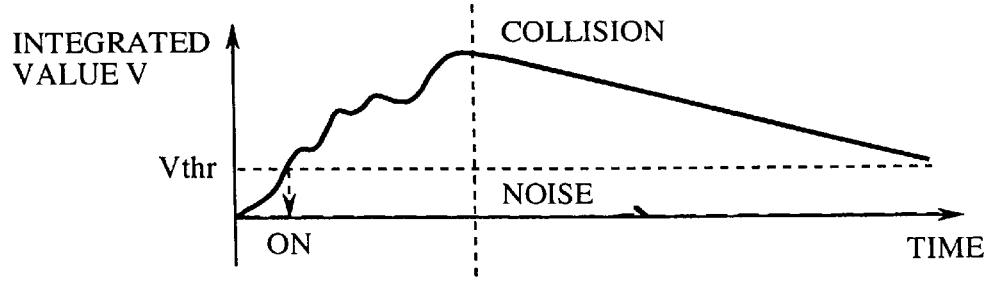

Electrical spurious noise is listed up as examples, which do not necessitate an operation of the passive safety device 2, except for the physical input above. The spurious noise is caused on a circuit, and is therefore added to the output signal from the acceleration sensor 3a to input to the microcomputer 3b. The majority of waveform of input has the form of pulse as shown in FIG. 6A. In this case, the acceleration integral becomes large due to integral as sequential process as shown in FIG. 6B. However, since the inputted impact acceleration G of the computation pursuant to the flowchart remains within a range defined between the minimum acceleration reference value GL and the maximum acceleration reference value GH, the acceleration integral is not performed, and the integrated acceleration value V is kept to zero. As a result, the integrated acceleration value V exceeds the driving signal output threshold value Vthr, and the driving signal is not outputted to the passive safety device.

As described above, according to the embodiment 1, a driving signal output threshold value Vthr of the passive safety device 2 is predetermined in memory of the microcomputer 3b, and the computation pursuant to the flowchart of FIG. 3 is performed. It is possible to operate precisely the passive safety device 2 only when collision of the vehicle is caused at high speed.

Moreover, with the embodiment 1, a case, where the driving signal output threshold value Vthr is set to extract the collision of the vehicle at high speed, is explained. It is possible to modify a sensitivity of determining the collision of vehicle at low speed by changing the driving signal output threshold value Vthr.

Embodiment 2

Figure 7:
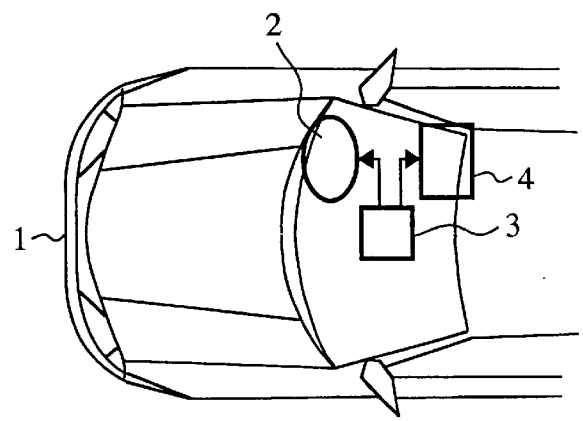
FIG. 7 is a plane view showing a front section of a vehicle providing with a passive safety system as embodiment 2 according to the present invention.
Figure 8:
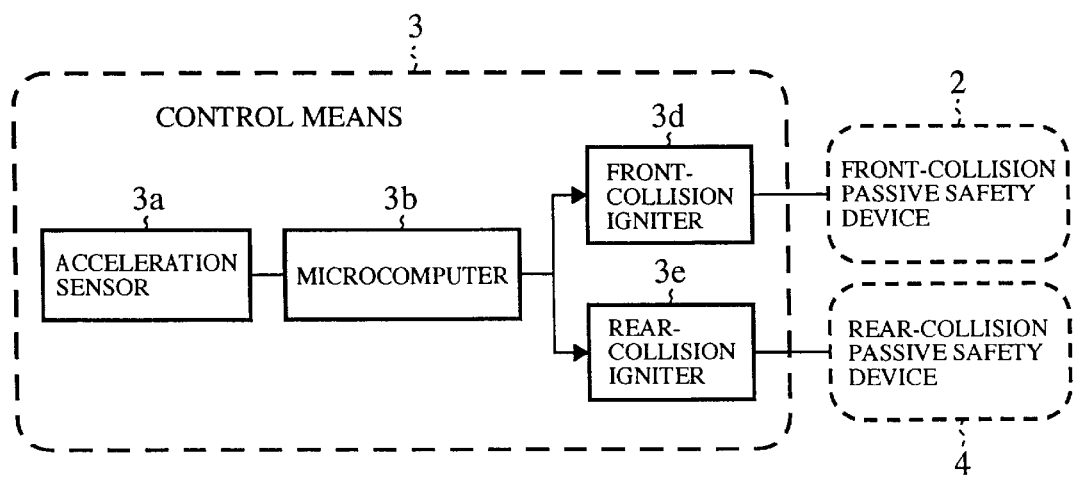
FIG. 8 is a block diagram showing the passive safety system of FIG. 7.

FIG. 7 is a plane view showing a front section of a vehicle providing with a passive safety system as embodiment 2 according to the present invention, and FIG. 8 is a block diagram showing the passive safety system of FIG. 7. Components of the embodiment 2 common to the components shown in FIG. 1 and FIG. 2 are denoted by the same reference numerals and further description will be omitted.

In FIG. 7, a reference numeral 1 denotes a vehicle, and a reference numeral 2 denotes a passive safety device for front-collision mounted on the vehicle 1. A reference numeral 4 denotes a passive safety device for rear-collision mounted on the vehicle 1. A reference numeral 3 denotes a common control means for driving both of the passive safety devices 3 and 4. As shown in FIG. 8, the control means 3 includes an acceleration sensor 3a for detecting impact acceleration caused at the time of front-collision of the vehicle 1, a microcomputer 3b inputted the acceleration detection signal from the acceleration sensor 3a as a digital data due to an A/D converter, a front-collision igniter 3d receiving an output signal from the microcomputer 3b to drive the front-collision passive safety device 3, and a rear-collision igniter 3e receiving an output signal from the microcomputer 3b to drive the rear-collision passive safety device 4. Here, an airbag is listed up as an example of the front-collision passive safety device 2, and a whiplash injury prevention device such as a headrest is listed up as an example of the rear-collision passive safety device 4. Moreover, a driving signal output threshold value Vthr2 is predetermined in memory of the microcomputer 3b.

Next, an operation will be explained.

The microcomputer 3b of the embodiment 2 computing physically the amplitude of the impact acceleration detection signal inputted from the acceleration sensor 3a, and determines whether it drives controllably the front-collision passive safety device 2 and the rear-collision passive safety device 4. When the large impact acceleration necessitating an operation of the front-collision passive safety device 2 based on the determination above is inputted, the front-collision igniter 3d outputs the driving signal to drive the front-collision passive safety device 2. Likewise, when the large impact acceleration necessitating an operation of the rear-collision passive safety device 4 is inputted, the rear-collision igniter 3e outputs the driving signal to drive the rear-collision passive safety device 4.

An operation according to a control program of the microcomputer 3b will be hereafter explained.

FIG. 9 is a flowchart for explaining an operation in FIG. 8, which relates to the determination of collision at the time of front-collision and rear-collision. In the flowchart of FIG. 9, the explanation regarding the step ST1 to the step ST11 is omitted in order to perform the same computation as the embodiment 1 (see FIG. 3), and only the explanation from step ST12 will be hereafter made.

A driving signal output threshold value Vthr2 necessitating an operation of the rear-collision passive safety device 4 is predetermined in the microcomputer 3b. In step ST12, the integrated acceleration value V, which is calculated in the step ST1 to the step ST11, is therefore compared with the driving signal output threshold value Vthr2, and the computation is performed to determine a rear-collision. As a result of the determination, when the integrated acceleration value V is lower than the driving signal output threshold value Vthr2, the process goes to step ST13. In the step ST13, the driving signal is outputted to drive the rear-collision passive safety device 4.

The performance of the computation process allows determination of the size of impact at the time of the rear-collision of the vehicle. Moreover, the computation process with respect to the front-collision is performed in a manner similar to the embodiment 1.

A real collision pattern regarding the only rear-collision will be hereafter explained, which relates to the timing of outputting a driving signal of airbag when the computation of the flowchart shown in the FIG. 9 is performed. When the rear-collision of the vehicle is caused, the impact acceleration having a negative component (acceleration component) is produced.

Figure 10A:
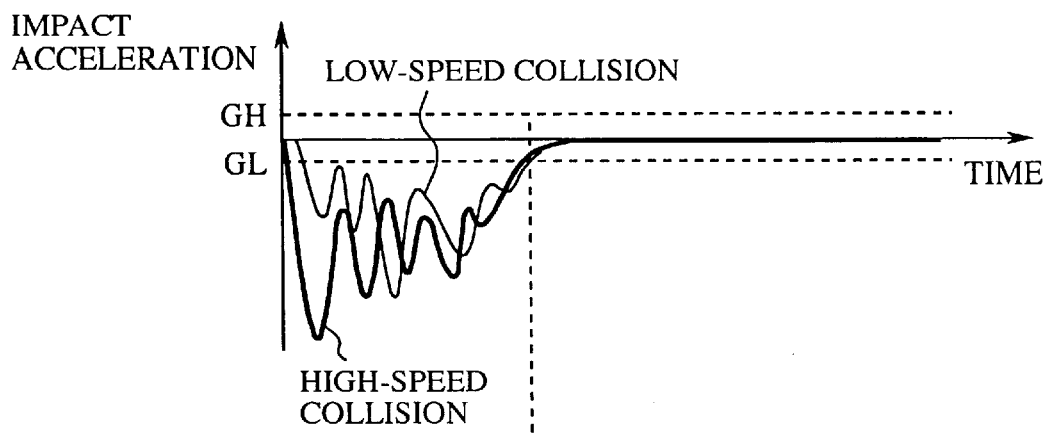
FIG. 10A, FIG. 10B and FIG. 10C are drawings showing timing of outputting a driving signal when an operation indicated in the flowchart of FIG. 9 is performed in real collision patterns (distinguishing high-speed collision from low-speed collision).
Figure 10B:
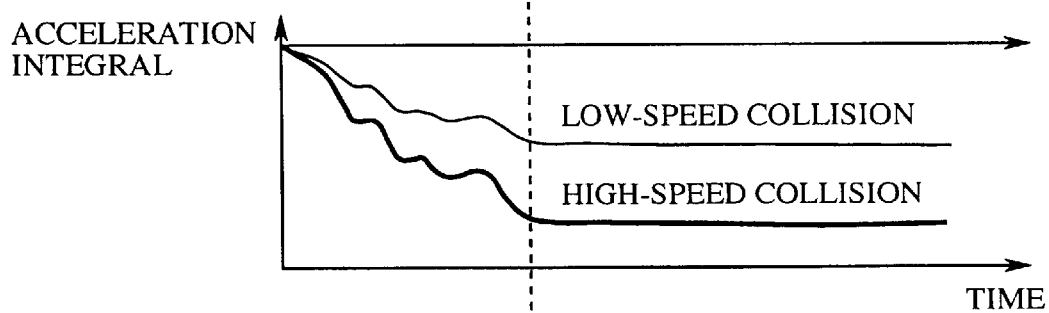

Impact accelerations, which are produced on high-speed collision and on low-speed collision, are shown in FIG. 10A. Here, the speed of the vehicle on collision is calculated due to the integral of the impact acceleration as shown in FIG. 10B. The size of collision is evaluated depending on the speed of the vehicle.

With the computation of the flowchart, when the collision is caused, the physical quantity falls short of the minimum acceleration reference value GL, and the integral process is therefore started. During the collision, the impact acceleration falling short of the minimum acceleration reference value GL is produced without interruption. The integrated value V, which is the approximately same as the acceleration integral as shown in FIG. 10B, is obtained as the computation result (see FIG. 10C).

Figure 10C:
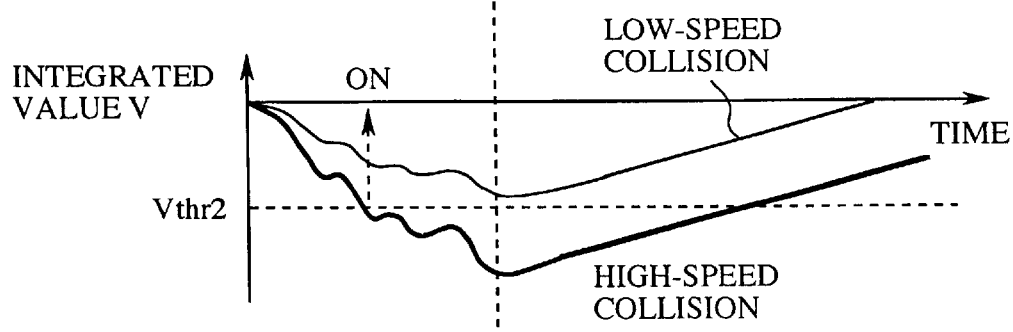

When the collision of the vehicle is caused at low speed which does not necessitate an operation of the passive safety device, the impact acceleration becomes small as shown in FIG. 10A, and the acceleration integral becomes also small as shown in FIG. 10B. Here, as shown in FIG. 10C., the integrated value V does not cross the rear-collision driving signal output threshold value Vthr2 predetermined. The driving signal is not outputted to the rear-collision passive safety device 4.

When the collision of the vehicle is however caused at high speed, the impact acceleration becomes large as shown in FIG. 10A, and the acceleration integral becomes also large as shown in FIG. 10B. In other words, the integrated value V, which is obtained by performing the computation pursuant to the flowchart of FIG. 9, falls short of the driving signal output threshold value Vthr2 as shown in FIG. 10C. At this time, the driving signal is outputted to operate the rear-collision passive safety device 4.

Cases, which do not necessitate an operation of the passive safety device except for the collision as described above, are the same as the embodiment 1, and the explanation will be omitted. Likewise, since the integrated acceleration value V does not fall short of the rear-collision driving signal threshold Value Vthr, the driving signal is outputted to the rear-collision passive safety device 4.

As described above, according to the embodiment 2, an additional driving signal detection threshold value Vthr2 with respect to the rear-collision is predetermined in the memory of the microcomputer 3b according to the embodiment 1 in order to perform the computation pursuant to the flowchart of FIG. 9. Therefore, it is possible to operate precisely the front-collision passive safety device 2 and the rear-collision passive safety device 4 only when the collision of the vehicle is caused at high speed.

Embodiment 3

Figure 11:
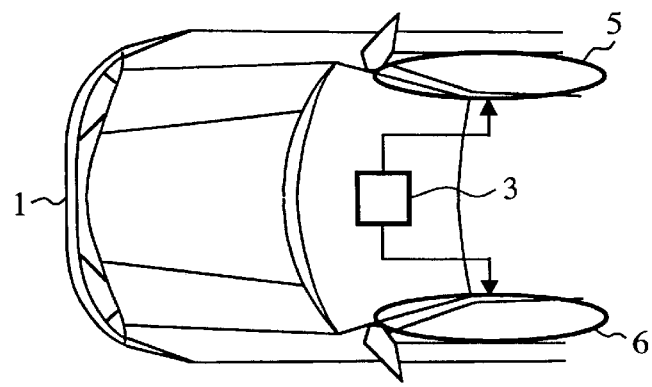
FIG. 11 is a plane view showing a front section of a vehicle providing with a passive safety system as embodiment 3 according to the present invention.
Figure 12:
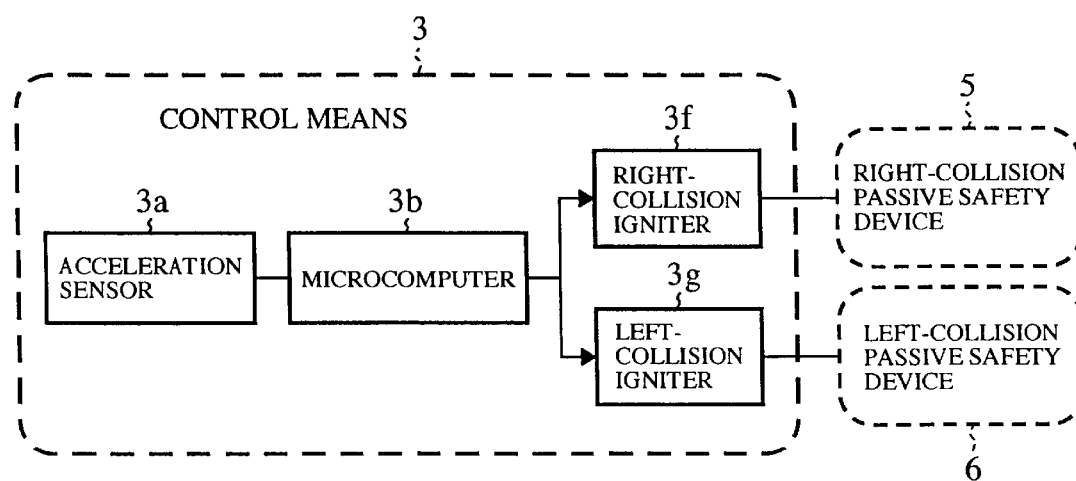
FIG. 12 is a block diagram showing the passive safety system of FIG. 11.

FIG. 11 is a plane view showing a front section of a vehicle providing with a passive safety system as embodiment 3 according to the present invention, and FIG. 12 is a block diagram showing the passive safety system of FIG. 11. Components of the embodiment 3 common to the components shown in FIG. 2 to FIG. 10 and FIG. 1 are denoted by the same reference numerals and further description will be omitted.

In FIG. 11, a reference numeral 5 denotes a right-collision passive safety device mounted on the vehicle 1, and similarly a reference numeral 6 denotes a left-collision passive safety device mounted on the vehicle 1.

In FIG. 12, a reference numeral 3f denotes a right-collision igniter, and a reference numeral 3g denotes a left-collision igniter. These igniters 3f and 3g receive output signals from the microcomputer 3b to drive the right-collision passive safety device 5 and the left-collision passive safety device 6, respectively. Here, side-collision airbags are listed up as an example of the passive safety devices 5 and 6.

Next, an operation will be explained.

The microcomputer 3b of the embodiment 3 computing physically the amplitude of the impact acceleration detection signal inputted from the acceleration sensor 3a, and determines whether it drives controllably the right-collision passive safety device 5 and the left-collision passive safety device 6. When the large impact acceleration necessitating an operation of the right-collision passive safety device 5 based on the determination above is inputted, the right-collision igniter 3f outputs the driving signal to drive the right-collision passive safety device 5. Likewise, when the large impact acceleration necessitating an operation of the left-collision passive safety device 6 is inputted, the left-collision igniter 3g outputs the driving signal to drive the left-collision passive safety device 6. With the embodiment 3, a driving signal output threshold value VthrR necessitating an operation of the right-collision passive safety device 5 and a driving signal output threshold value VthrL necessitating an operation of the left-collision passive safety device 6 are predetermined in the memory of the microcomputer 3b.

A control and an operation of the microcomputer 3b will be hereafter explained.

FIG. 13 is a flowchart for explaining an operation in FIG. 12, which relates to the determination of collision at the time of left-collision and right-collision. In the flowchart of FIG. 13, the explanation regarding the step ST1 to the step ST9 is omitted in order to perform the same or equivalent computation as the embodiment 2 (see FIG. 9), and only the explanation from step ST14 will be hereafter made. Moreover, the input G in a rightward direction is positive as for the polarity of the input G.

A driving signal output threshold value VthrR necessitating an operation of the right-collision passive safety device 5 is predetermined in the microcomputer 3b. In step ST14, the integrated acceleration value V, which is calculated in the step ST1 to the step ST9, is therefore compared with the right-collision driving signal output threshold value VthrR, and the computation is performed to determine a right-collision. As a result of the determination, when the integrated acceleration value V exceeds the driving signal output threshold value VthrR, the process goes to step ST15. In the step ST15, the driving signal is outputted to drive the right-collision passive safety device 5.

Likewise, in step ST14, the integrated acceleration value V is compared with the left-collision driving signal output threshold value VthrL, and the computation is performed to determine a left-collision. As a result of the determination, when the integrated acceleration value V falls short of the driving signal output threshold value VthrL, the process goes to step ST17. In the step ST17, the driving signal is outputted to drive the left-collision passive safety device 6.

The performance of the computation process allows determination of the size of impact at the time of the right and left-collisions of the vehicle.

In real collision patterns, the timing of outputting a driving signal of airbag when the computation of the flowchart shown in FIG. 13 is the same as the embodiment 2, and the explanation will be omitted. When the integrated acceleration value V exceeds the threshold values, the driving signal is outputted to the passive safety device. When the integrated acceleration value V remains within the range of the threshold values above, it does not necessitate an operation of the passive safety device, and the driving signal is outputted to the passive safety device.

As described above, according to the embodiment 3, additional driving signal detection threshold values VthrR and VthrL with respect to the right and left-collisions are predetermined in the memory of the microcomputer 3b of the embodiment 2 in order to perform the computation pursuant to the flowchart of FIG. 13. Therefore, it is possible to operate precisely the right-collision passive safety device 5 and the left-collision passive safety device 6 only when the collision of the vehicle is caused at high speed.

Embodiment 4

FIG. 14 is a flowchart for explaining an operation of a microcomputer applicable to a passive safety device as embodiment 4 according to the present invention. Components or steps of the embodiment 4 common to the components or steps of FIG. 3 are denoted by the same or equivalent reference numerals and further description will be omitted.

In the step ST1 to the step ST11, the same processes as embodiment 1 are performed, and further description will be omitted. Only additional steps ST18 and ST19 distinguishing a vibration at the time of driving on a rough road from a collision at an early stage will be explained.

When the input G of the step ST1 crosses the range of the acceleration resetting the integrated value GL to GH predetermined, and the process goes to step ST18 to determine whether the input G falls short of zero (G<0). As a result of the determination, when the input G falls short of zero, and the process goes to step ST19. In the step ST19, when the input G is negative, the input G is multiplied by a predetermined weight factor K. The integrated acceleration value V, which is weighed by the negative input G, is calculated due to the addition of steps ST18 and ST19 above.

In real collision patterns, the timing of outputting a driving signal of airbag when the computation of the flowchart of FIG. 14 is performed will be hereafter explained.

Figure 15A:
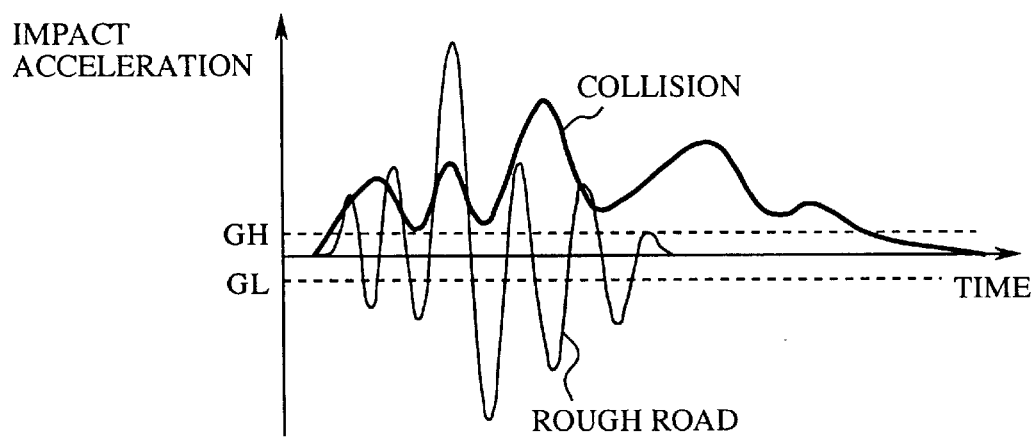
FIG. 15A, FIG. 15B and FIG. 15C are drawings showing timing for output a driving signal when an operation indicated in the flowchart of FIG. 14 is performed in real collision patterns (distinguishing a collision from rough road or braking).

A waveform of the impact acceleration at the time of collision, which necessitates an operation of the passive safety device, and a waveform produced at the time of driving on the rough road, which does not necessitate the operation of the passive safety device, are shown in FIG. 15A. A positive component (deceleration component) of the waveform of the impact acceleration at the time of collision predominates, and it is characterized in that the acceleration integral is large as shown in FIG. 15B.

Figure 15B:
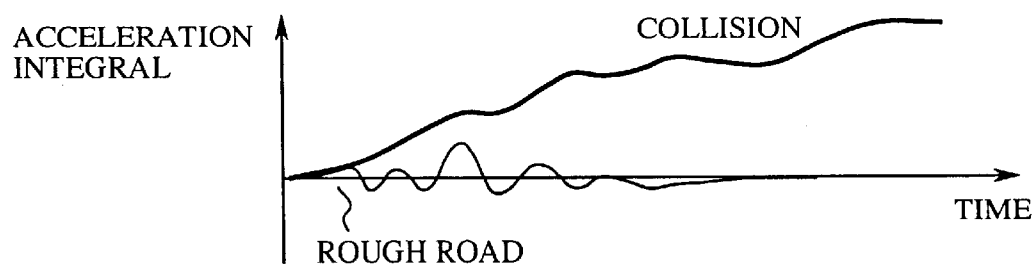

On the other hand, the waveform of the impact acceleration at the time of driving on the rough road is a large-amplitude wave of vibration as shown in FIG. 15A, and it is characterized in that the acceleration integral is small as shown in FIG. 15B.

With the embodiment 1, the threshold value is predetermined to distinguish the integrated acceleration value being small at the time of driving on the rough road from the integrated acceleration value being large at the time of collision. In this case, a driving signal outputting threshold value exceeding a VthrA must be predetermined prior to distinguishing from the rough road (unweighed). At this time, timing being distinguished is a TonA shown in FIG. 15C.

Figure 15C:
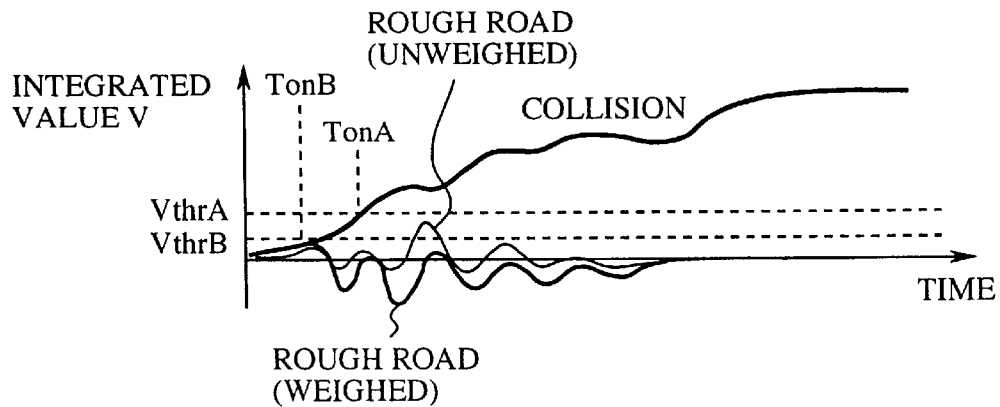

With the computation pursuant to the flowchart of FIG. 14 according to the embodiment 4, the negative component is multiplied by the weight factor K. The vibration wave at the time of driving on the rough road is assigned weights to the negative component. In this way, the integrated acceleration value V substantially decreases as compared with the real acceleration integral. On the other hand, the positive component of the waveform at the time of collision predominates, and the reduction of the case is smaller than that of the rough road driving case. As shown in FIG. 15C, the integrated acceleration value V is retarded at the rough road (weighed), and it is possible to reduce the threshold value for outputting the driving signal to the VthrB. In the case, timing being distinguished is a TonB shown in FIG. 15C, and it is possible to distinguish the threshold value V in early timing.

As described above, according to the embodiment 4, due to the computation multiplied by the predetermined weight factor K as the negative component, it is possible to promptly distinguish the large-amplitude vibration waveform of the impact acceleration such as the rough road from the collision waveform, and operate precisely the passive safety device.

Moreover, with the embodiment 4, the passive safety system having a single passive safety device is indicated. When the system must control a plurality of the passive safety devices, flows similar to the flows above may be added. Therefore, it is possible to perform operation and control of the passive safety devices in early timing.

Embodiment 5

Figure 16:
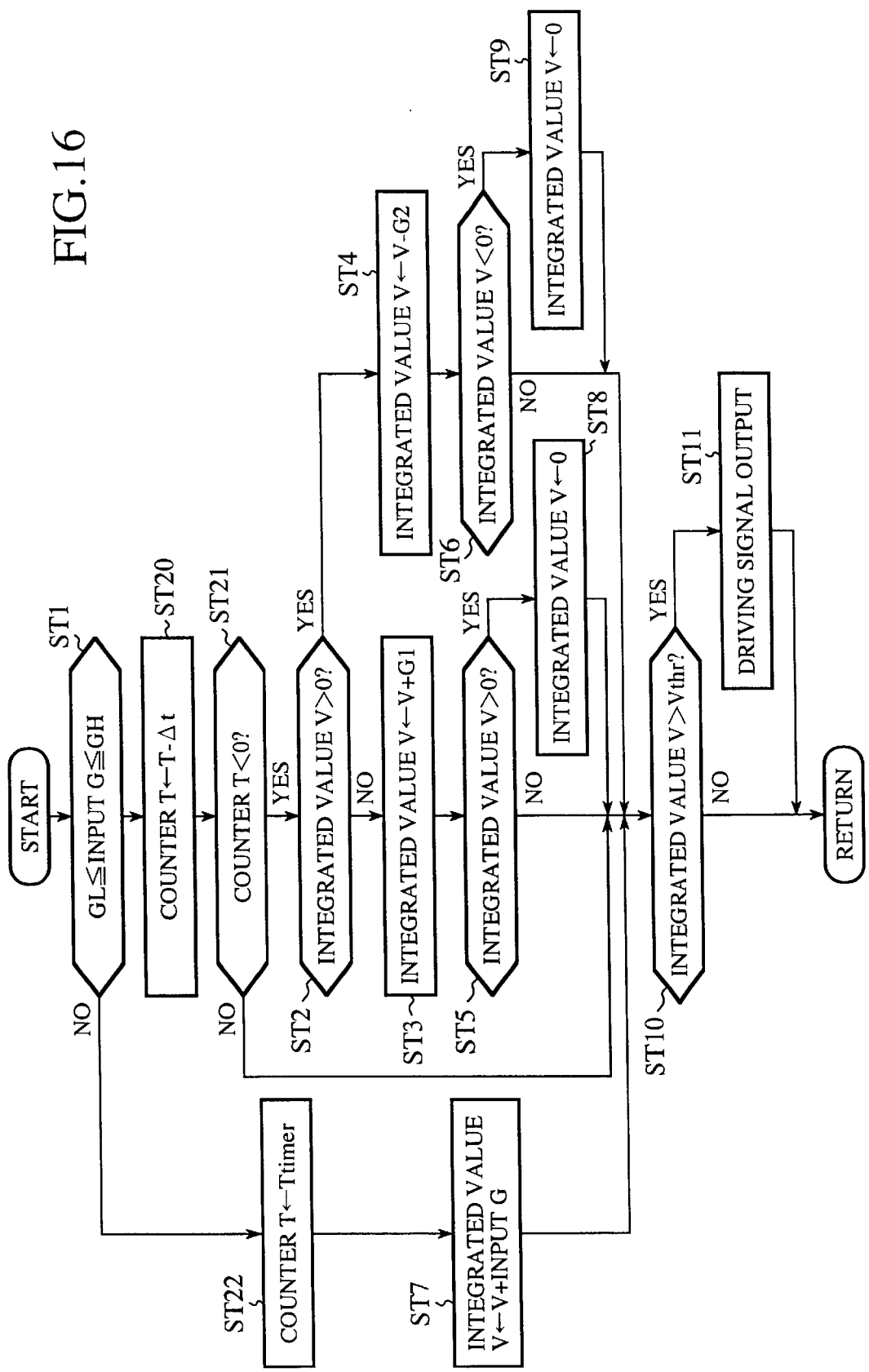
FIG. 16 is a flowchart used for performing a computation within a microcomputer in embodiment 5 according to the present invention.

FIG. 16 is a flowchart for explaining an operation of a microcomputer applicable to a passive safety device as embodiment 5 according to the present invention. Components or steps of the embodiment 5 common to the components or steps of FIG. 3 are denoted by the same or equivalent reference numerals and further description will be omitted.

In the step ST1 to the step ST11, the same processes as embodiment 1 are performed, and further description will be omitted. Only additional steps ST20, ST21 and ST22 performing a timer process to delay a reset process, which resets the integrated acceleration value, will be explained.

When the input G of the step ST1 crosses the range of the acceleration resetting the integrated value GL to GH predetermined, and the process goes to step ST22 to reset a timer counter T to a delay time T timer predetermined.

On the other hand, the input G does not cross the range of the acceleration resetting the integrated value GL to GH predetermined, and the process goes to the step ST20. In the step ST20, a sampling time A t is subtracted from the timer counter T, and the process goes to the step ST21. In the step ST21, the subtracted timer counter T is evaluated. When the timer counter T is zero or less, the process goes to the step ST2 to converge the integrated acceleration value V to zero. When the timer counter exceeds zero, the integrated acceleration value V is kept to zero, and the process goes to the step ST10.

In this way, it is possible to modify timing of performing the reset process for resetting the integrated acceleration value V to converge the integrated acceleration value to zero.

In real collision patterns, performance of the computation of the flowchart of FIG. 16 will be hereafter explained.

With the embodiments 1 to 4, cases where the impact acceleration continuously caused on collision are described. In real collisions, waveforms of the impact acceleration vary with collision modes of the vehicle, and kinds of the impact acceleration vary with layouts of constituent parts of the vehicle even if the same patterns of collision are caused.

FIG. 17 is a result of computation when the contents of the computation in a collision determination method, which is applicable to a passive safety system according to the embodiment 5, are applicable to real collision patterns.

Figure 17A:
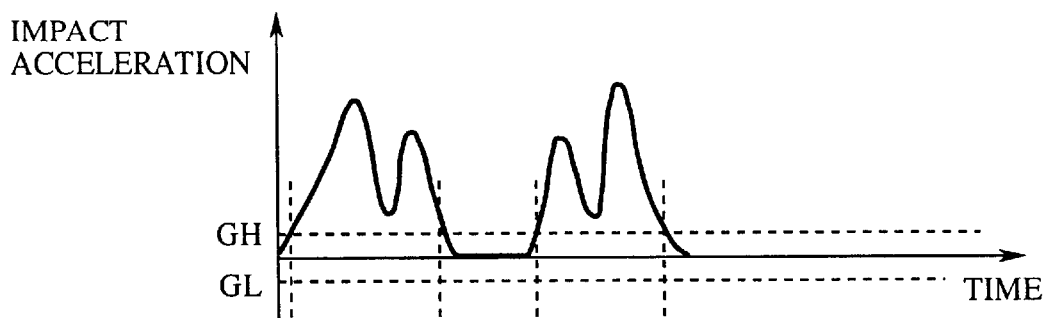
FIG. 17A, FIG. 17B, FIG. 17C and FIG. 17D are drawings showing a process content of a delay timer when an operation indicated in the flowchart of FIG. 16 is performed in real collision patterns (collision having a rest section).

FIG. 17A explains a vehicle and a collision pattern forming a region having a small occurrence G defined between first and second waves in the waveform of the impact acceleration.

Figure 17B:

With the impact acceleration as shown in FIG. 17A, the acceleration integral is indicated in FIG. 17B.

Figure 17C:
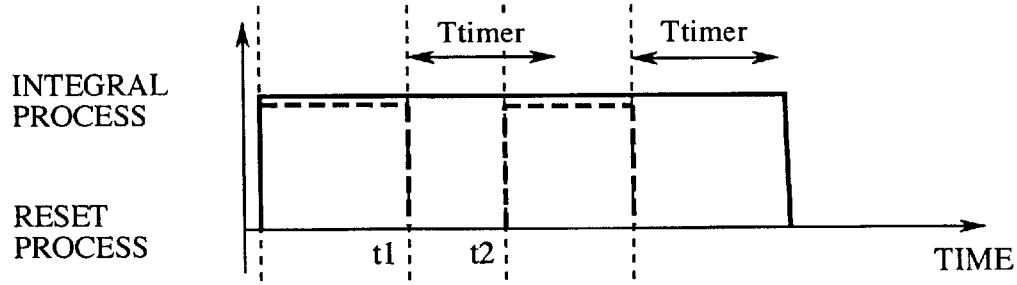

FIG. 17C shows a computation mode to which the computations of the embodiment 1 to the embodiment 4 are applicable. When the input G crosses the range of the acceleration resetting the integrated value GL to GH, the computation process is performed. When the input G remains within the range of the acceleration resetting the integrated value GL to GH, timing of performing the reset process for resetting the integrated value (to converge the integrated acceleration value to zero) is seen.

Figure 17D:
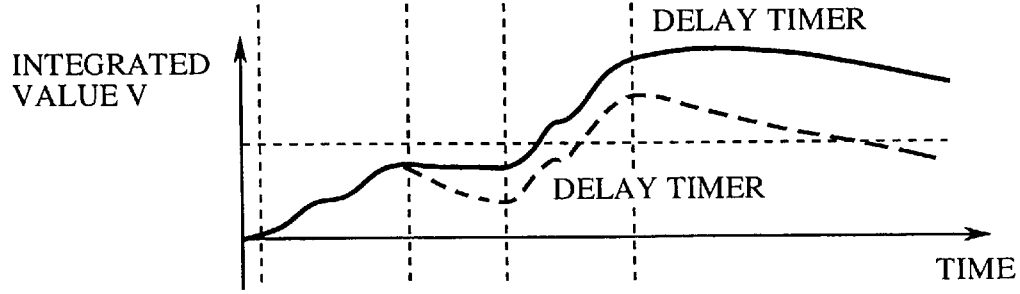

When the computations of the embodiment 1 to the embodiment 4 are applicable to the embodiment 5, the integrated acceleration value V is indicated in FIG. 17D. As a result of the computation, the integrated acceleration value V is converged to zero at a time period (T1 to T2) over which the impact acceleration G remains within the range of GL to GH, and attenuates significantly as compared with the real acceleration integral. Therefore, according to the computation pursuant to the flowchart of FIG. 16, for a time period equivalent to the T timer after the impact acceleration enters in the range of GL to GH, the reset process is held or postponed. The integrated acceleration value V is pending for the time period (T1 to T2) when the impact acceleration G remains within the range of GL to GH. Therefore, it is possible to recreate precisely the real acceleration integral as shown in FIG. 17D.

Moreover, with the embodiment 5, the passive safety system having a single passive safety device is indicated. When the system must control a plurality of the passive safety devices, flows similar to the flows above may be added. Therefore, it is possible to perform a delay process for resetting the integrated value. With each embodiment, the airbags and the side-airbags for example are explained as the passive safety device. Alternatively, the respective embodiments may be applicable to a seatbelt pretension device and a head-rest shock absorber for preventing a whiplash injury.

The present invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A passive safety system, comprising:
a passive safety device mounted on a vehicle; and
a passive safety control means having an acceleration sensor detecting acceleration caused by an impact at the time of collision, said passive safety control means receiving as an input an impact acceleration detection signal from the acceleration sensor and controllably operating the passive safety device,
wherein the passive safety control means computes a physical quantity based on the impact acceleration detection signal inputted from the acceleration sensor, sets maximum and minimum reference values of the physical quantity in normal driving, performs a computation with respect to addition of a present acceleration inputted from the acceleration sensor to an integrated acceleration value when the physical quantity crosses a range defined between the maximum and minimum reference values, and performs a computation with respect to a reset process of the integrated accelerating value when the physical quantity remains within the range defined between the maximum and minimum reference values.

2. A passive safety system according to claim 1,
wherein the passive safety control means outputs an operational signal operating the passive safety device when an integrated reference value of the integrated acceleration value computed based on the impact acceleration detection signal is inputted from the acceleration sensor.

3. A passive safety system according to claim 1,
wherein the passive safety control means has a high-frequency attenuation means attenuating a high-frequency with respect to an impact signal inputted from the acceleration sensor, the impact signal being a physical quantity operated on the basis of the impact acceleration detection signal inputted from the acceleration sensor, the high-frequency attenuation means including a high-frequency breaking circuit and a sectional balancing process means; and a feature of processing an operational result passed through the high-frequency attenuation means as an input value.

4. A passive safety system according to claim 1,
wherein the passive safety control means includes a filter means extracting a frequency component being a physical quantity operated on the basis of the impact acceleration detection signal inputted from the acceleration sensor, which is peculiar to a collision of the vehicle from the acceleration signal inputted from the acceleration sensor; and a feature of processing an operational result passed through the filter means as an input value.

5. A passive safety system according to claim 1,
wherein the passive safety control means has features of dividing a physical quantity operated on the basis of the impact acceleration detection signal inputted from the acceleration sensor into negative and positive components, setting a required weighted scaling with respect to the negative and positive components, and processing an operational result due to the weighted scaling as an input value.

6. A passive safety system, comprising:
a passive safety device mounted on a vehicle; and
a passive safety control means having an acceleration sensor detecting acceleration caused by an impact at the time of collision, said passive safety control means receiving as an input an impact acceleration detection signal from the acceleration sensor and controllably operating the passive safety device,
wherein the passive safety control means has features of computing a physical quantity based on the impact acceleration detection signal inputted from the acceleration sensor, setting maximum and minimum reference values of the physical quantity in normal driving, performing a computation with respect to addition of a present acceleration inputted from the acceleration sensor to the physical quantity when the physical quantity crosses a range defined between the maximum and minimum reference values, setting a function of operating a subtraction value or an addition value with respect to the present integrated acceleration value when the physical quantity remains within the range defined between the maximum and minimum reference values, and performing a subtraction or an addition of the integrated acceleration value based on the function to modify a reset period of the integrated acceleration value.

7. A passive safety system according to claim 6,
wherein the passive safety control means computes a physical quantity based on the impact acceleration detection signal inputted from the acceleration sensor, sets maximum and minimum reference values of the physical quantity in normal driving, performs a subtraction of an integrated acceleration value when the integrated acceleration value at the time the physical quantity crosses a range defined between the maximum and minimum reference values is positive, and performs an addition of the integrated acceleration value when the integrated acceleration value at the time the physical quantity remains within the range defined between the maximum and minimum reference value is negative.

8. A passive safety system according to claim 6,
wherein the acceleration sensor is set to detect the acceleration in a longitudinal direction of the vehicle, and
wherein when any one of front and rear sides is defined as the positive component of the acceleration sensor, the other side is defined as the negative component of the acceleration sensor, the passive safety control means has features of operating controllably the passive safety device arranged at a positive component side when the integrated acceleration value based on the acceleration detection signal inputted from the acceleration sensor exceeds a reference value of the integrated acceleration value set as the positive component, and operating controllably the passive safety device arranged at a negative component side when the integrated acceleration value based on the acceleration detection signal inputted from the acceleration sensor does not attain a reference value of the integrated acceleration value set as the negative component.

9. A passive safety system according to claim 6,
wherein the acceleration sensor is set to detect the acceleration in a lateral direction of the vehicle, and
wherein when any one of right and left sides is defined as the positive component of the acceleration sensor, the other side is defined as the negative component of the acceleration sensor, the passive safety control means has features of operating controllably the passive safety device arranged at a positive component side when the integrated acceleration value based on the acceleration detection signal inputted from the acceleration sensor exceeds a reference value of the integrated acceleration value set as the positive component, and operating controllably the passive safety device arranged at a negative component side when the integrated acceleration value based on the acceleration detection signal inputted from the acceleration sensor does not attain a reference value of the integrated acceleration value set as the negative component.

10. A passive safety system, comprising:

a passive safety device mounted on a vehicle; and a passive safety control leans having an acceleration sensor detecting acceleration caused by an impact at the time of collision, said passive safety control means receiving as an input an impact acceleration detection signal from the acceleration sensor and controllably operating the passive safety device, wherein the passive safety control means has features of computing a physical quantity based on the impact acceleration detection signal inputted from the acceleration sensor, setting maximum and minimum reference values of the physical quantity in normal driving, performing a computation with respect to addition of a present acceleration inputted from the acceleration sensor to an integrated acceleration value when the physical quantity crosses a range defined between the maximum and minimum reference values, measuring a period of time after the physical quantity exceeds the range, and postponing a reset process of the integrated acceleration value when the measured time period is shorter than a required period.

11. A method of providing passive vehicle safety via a passive safety device and an acceleration sensor that detects acceleration caused by an impact at a time of a collision, comprising the steps of:

computing a physical quantity based on an acceleration signal inputted from the acceleration sensor;

setting maximum and minimum reference values of the physical quantity in normal driving;

performing a computation with respect to addition of a present acceleration inputted from the acceleration sensor to an integrated acceleration value when the physical quantity is not within a range defined between the maximum and minimum reference values; and performing a computation with respect to a reset process of the integrated acceleration value when the physical quantity is within the range defined between the maximum and minimum reference values, wherein said acceleration sensor outputs an impact acceleration detection signal that controls operation of the passive safety device.

12. The method of claim 11, further comprising:

outputting an operational signal for operating the passive safety device upon receiving an integrated reference value of the integrated acceleration value computed based on the impact acceleration detection signal.

13. The method of claim 12, wherein said outputting is performed by a passive safety controller, and said integrated reference value is received from said acceleration sensor.

14. The method of claim 11, further comprising:

attenuating a high-frequency, via a high-frequency attenuator with respect to a received impact signal, the impact signal being said physical quantity, which is operated on the basis of the impact acceleration detection signal, wherein said attenuating step includes high-frequency breaking and sectional balancing; and processing an operational result passed through the high-frequency attenuator as an input value.

15. The method of claim 11, further comprising:

extracting a frequency component that comprises said physical quantity, via a filter operated based on the impact detection signal, which is peculiar to a collision from acceleration the acceleration signal; and processing an operational result passed through the filter as an input value.

16. The method of claim 11, further comprising:

dividing the physical quantity which is operated based on the impact acceleration detection signal inputted from the acceleration sensor, into negative and positive components;

setting a required weighted scaling with respect to the negative and positive components; and processing an operational result due to the weighted scaling as an input value.

17. The method of claim 11, further comprising:

setting a function that operates a subtraction value or an addition value with respect to the present integrated acceleration value when the physical quantity remains within said range; and performing a subtraction or an addition of the integrated acceleration value based on the function to modify a reset period of the integrated acceleration value.

18. The method of claim 11, further comprising postponing a reset process of the integrated acceleration value when the measured time period is shorter than a required period.

* * * * *